(12) United States Patent
Snekkenes

(10) Patent No.: US 8,545,674 B2
(45) Date of Patent: Oct. 1, 2013

(54) METHOD TO USE HEAT ENERGY FROM BLACK LIQUOR

(75) Inventor: Vidar Snekkenes, Oslo (NO)

(73) Assignee: Metso Paper Sweden AB, Sundsvall (SE)

( * ) Notice: Subject to any disclaimer, the term of this patent is extended or adjusted under 35 U.S.C. 154(b) by 761 days.

(21) Appl. No.: 12/515,039

(22) PCT Filed: Nov. 20, 2007

(86) PCT No.: PCT/SE2007/050875
§ 371 (c)(1),
(2), (4) Date: Sep. 17, 2009

(87) PCT Pub. No.: WO2008/063127
PCT Pub. Date: May 29, 2008

(65) Prior Publication Data
US 2010/0012283 A1  Jan. 21, 2010

(30) Foreign Application Priority Data
Nov. 22, 2006 (SE) ....................... 0602476

(51) Int. Cl.
*D21C 11/06* (2006.01)

(52) U.S. Cl.
USPC .......................................... 162/47

(58) Field of Classification Search
USPC .......................................... 162/47
See application file for complete search history.

(56) References Cited

U.S. PATENT DOCUMENTS

| | | | | |
|---|---|---|---|---|
| 5,779,856 | A * | 7/1998 | Kettunen ................. | 162/34 |
| 6,106,667 | A * | 8/2000 | Henricson ................ | 162/37 |
| 6,939,439 | B1 * | 9/2005 | Paakki et al. ............ | 162/40 |
| 2002/0036069 | A1 * | 3/2002 | Kettunen et al. ......... | 162/47 |
| 2005/0173081 | A1 * | 8/2005 | Snekkenes et al. ...... | 162/29 |

* cited by examiner

*Primary Examiner* — Jacob Thomas Minskey
(74) *Attorney, Agent, or Firm* — Rolf Fasth; Fasth Law Offices

(57) ABSTRACT

The method is for retrieving heat from black liquor wherein the black liquor is withdrawn from a digester in association with the production of cellulose pulp. The black liquor at the withdrawal stage maintains a first withdrawal temperature. At least a part of the black liquor is led to a heat exchanger. An exchange of heat takes place in the heat exchanger between the black liquor and a bleaching filtrate that has been obtained from the bleaching plant. The exchange of heat results in the bleaching filtrate experiencing a raise in temperature of at least 5° C., after which the heated bleaching filtrate is used in the bleaching plant.

10 Claims, 4 Drawing Sheets

METHOD TO USE HEAT ENERGY FROM BLACK LIQUOR

PRIOR APPLICATION

This application is a U.S. national phase application based on International Application No. PCT/SE2007/050875, filed 20 Nov. 2007, claiming priority from Swedish Patent Application No. 0602476-4, filed 22 Nov. 2006.

TECHNICAL AREA

The present invention concerns a method to retrieve heat from black liquor, where the black liquor is withdrawn from a digester in association with the production of cellulose pulp. The black liquor when withdrawn from the digester maintains a first withdrawal temperature.

BACKGROUND AND SUMMARY OF THE INVENTION

Normally, black liquor has lost its value as a heat-carrier in the digestion plant when its temperature has fallen to 90-125° C., where the fluids that are to be heated normally have a temperature around 85-90° C. The difference in temperature is here too small to justify further exchange of heat, etc., with process fluids in the digestion plant. Normally, therefore, the black liquor is cooled to a manageable temperature around 80-85° C., to be stored in black liquor tanks. Warm water of a relatively low temperature is obtained during the cooling process.

Large volumes of water is used in traditional bleaching plants for cellulose pulp, in a process carried out at low temperatures. The water used in the bleaching plant often came from the digestion plant, where the water had been warmed by, for example, the withdrawn black liquor.

Less water is now used in the bleaching plant, and the bleaching process is carried out at higher temperatures. The amount of heat that is present in the warm water from the digestion plant is not sufficient to reach the temperatures that are required in order to heat a bleaching filtrate from a digestion plant through heat exchange. Large quantities of steam are, for this reason, used to heat the bleaching filtrate, requiring a lot of energy and costs for production. This results also in an excess of heated water in the digestion plants, which water could not be properly used.

A first aim of the invention is to achieve an energy-efficient method to heat a bleaching filtrate in a bleaching plant.

A second aim is to use by a method a withdrawal of black liquor from a digester in order to heat a bleaching filtrate from a bleaching plant.

A third aim of the invention is to use efficiently the heat energy that is present in black liquor for the bleaching plant, where the black liquor has a temperature in the range 90-125° C.

A fourth aim is to reduce the need for the supply of steam in the bleaching plant, where the supplied steam is used to heat a bleaching filtrate.

The invention intends to reveal a method for how heat energy in black liquor, withdrawn from a digester, can be exploited in a new manner. The method is based on the indirect exchange of heat between the withdrawn black liquor and a bleaching filtrate from a bleaching plant.

The black liquor may be led directly to the heat exchanger, or indirectly through its use in a stage in the digester system, which results in the black liquor experiencing a fall in temperature, before it is led to the heat exchange stage with the bleaching filtrate.

Using, directly or indirectly, the quantity of heat that is present in the black liquor to heat the bleaching filtrate enables a number of advantages to be obtained, compared with the prior art. One such advantage is a reduction in the quantity of steam or other form of heating for the bleaching filtrate. Since the black liquor heats the bleaching filtrate directly, the heating takes place at a higher energy level than would be the case if the black liquor first should heat water and the water subsequently used to heat the bleaching filtrate.

The method also makes it possible to exploit the heat energy in black liquor in cases in which the temperature of the black liquor is as low as 90-125° C. Black liquor at such low temperatures would otherwise have been cooled off and stored in black liquor tanks.

The method allows the consumption of steam used to heat the bleaching filtrate to be reduced, and in the best of cases, to become unnecessary.

DETAILED DESCRIPTION OF THE INVENTION

Figure 1:
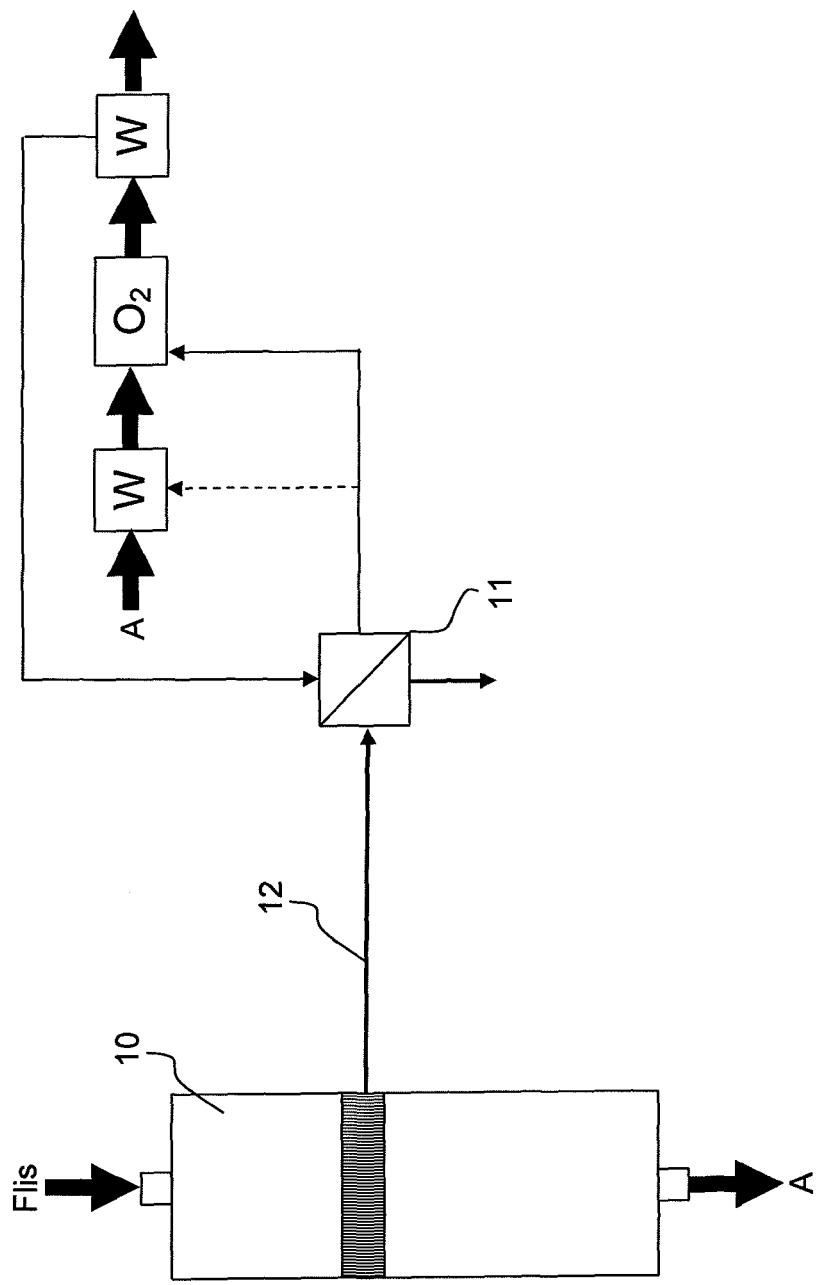
FIG. 1 shows a first preferred embodiment of the invention, in which black liquor is led directly to a heat exchanger, for indirect heat exchange with a bleaching filtrate.

FIG. 1 shows a first preferred embodiment of the method for which a patent is sought, which method is to retrieve heat from black liquor, where the black liquor is withdrawn from a digester 10 in association with the production of cellulose pulp.

The black liquor when withdrawn from the digester maintains a first withdrawal temperature in the interval 100-180° C., where the digester maintains a cooking temperature of 130-180° C.

At least a part of the withdrawn black liquor is led after the withdrawal along a first line 12 to a first heat exchanger 11. An indirect exchange of heat is enabled in the first heat exchanger 11 between the black liquor and a bleaching filtrate that has been obtained from the bleaching plant. The bleaching filtrate maintains a temperature in the interval 45-90° C. immediately before it is to undergo heat exchange with the black liquor. The indirect heat exchange results in the bleaching filtrate obtaining a raise in temperature of at least 5° C., after which the heated bleaching filtrate is used in the bleaching plant. The temperature of the black liquor before the heat exchange remains essentially at the withdrawal temperature, in the interval 90-180° C.

The bleaching filtrate that is heated is filtrate from a washing arrangement arranged after a pre-bleaching stage, preferably an oxygen delignification stage. The heated bleaching filtrate is used as dilution fluid before this oxygen delignification stage, whereby the cellulose pulp that is to be delignified in an oxygen stage is not only diluted to a suitable consistency but also experiences heating, and thus a reduction in the requirement of steam or other form of heating.

Figure 2:
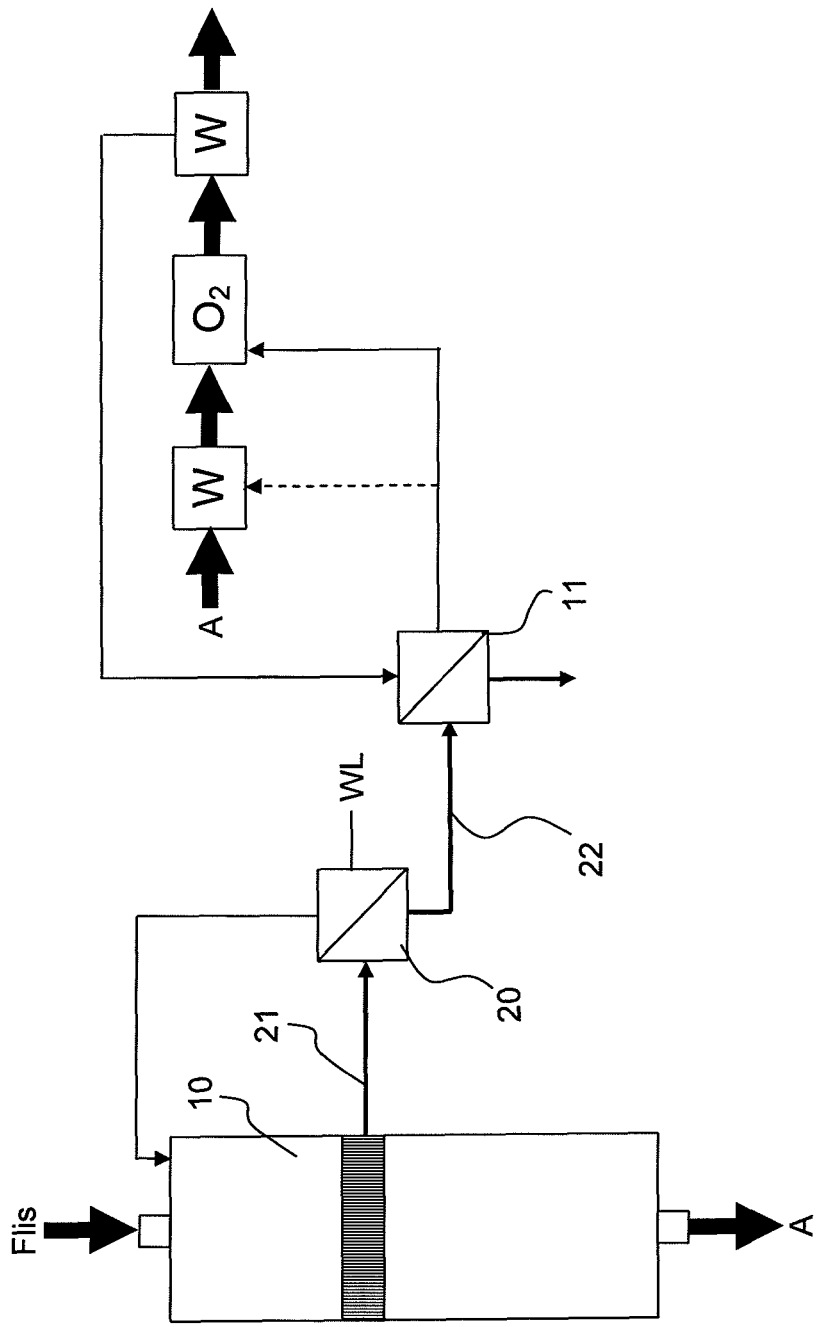
FIG. 2 shows a second preferred embodiment of the invention, in which the temperature of the black liquor is reduced by heat exchange with a process fluid before the black liquor is led to indirect heat exchange with the bleaching filtrate.

FIG. 2 shows a second preferred embodiment of the method for which a patent is sought. Black liquor is withdrawn from the digester 10 at a temperature of 125-180° C., where the digester maintains a cooking temperature of 130-180° C.

At least a part of the withdrawn black liquor is led after the withdrawal along a first line 21 to a second heat exchanger 20. An indirect exchange of heat is enabled in the second heat exchanger 20 between the black liquor and a process fluid in the digestion plant, preferably cooking fluid in the form of white liquor that, after heating by the black liquor in the second heat exchanger, is led to the digester 10 in order there to function as cooking liquid. The black liquor after its passage through the second heat exchanger has experienced a reduction in temperature of at least 20° C. in the range of temperatures 90-125° C. The black liquor is subsequently led along a line 22 to the first heat exchanger 11.

An indirect exchange of heat is enabled in the first heat exchanger 11 between the black liquor and the bleaching filtrate that has been obtained from the bleaching plant. The bleaching filtrate maintains a temperature in the interval 45-90° C. immediately before it is to undergo heat exchange with the black liquor. The indirect heat exchange results in the bleaching filtrate obtaining a raise in temperature of at least 5° C., after which the heated bleaching filtrate is used in the bleaching plant. The temperature of the black liquor before the heat exchange remains essentially at the withdrawal temperature, in the interval 90-180° C.

The bleaching filtrate that is heated is filtrate from a washing arrangement arranged after a pre-bleaching stage, preferably an oxygen delignification stage. The heated bleaching filtrate is used as dilution fluid before this oxygen delignification stage, whereby the cellulose pulp that is to be delignified in an oxygen stage is not only diluted to a suitable consistency but also experiences heating, and thus a reduction in the requirement of steam or other form of heating.

Figure 3:
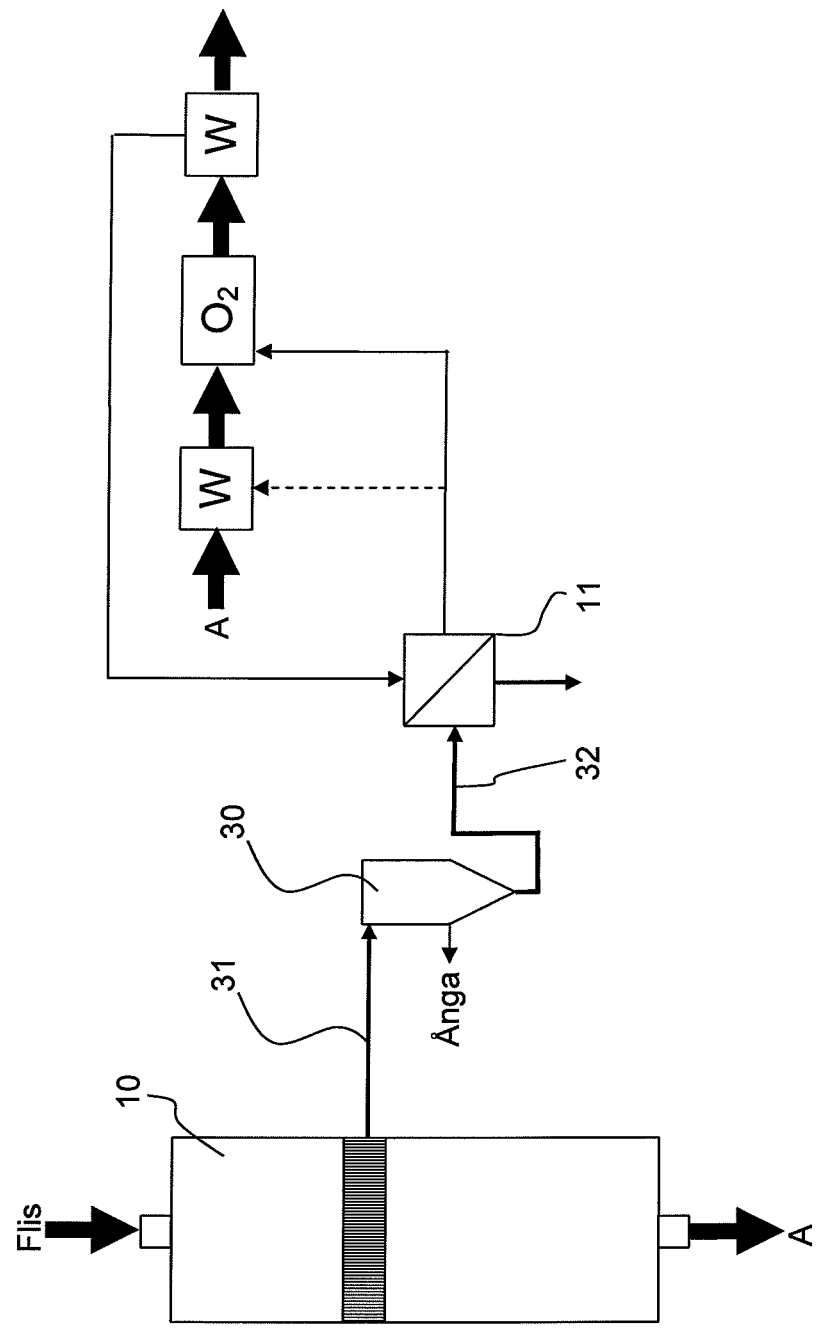
FIG. 3 shows a third preferred embodiment of the invention, in which the temperature of the black liquor is reduced by the reduction of pressure before the black liquor is led to indirect heat exchange with the bleaching filtrate.

FIG. 3 shows a third preferred embodiment of the method for which a patent is sought. Black liquor is withdrawn from the digester 10 at a temperature of 125-180° C., where the digester maintains a cooking temperature of 130-180° C.

At least a part of the withdrawn black liquor is led after the withdrawal of black liquor along a line 31 to an expansion vessel 30. The pressure of the black liquor is reduced in the expansion vessel, and the black liquor experiences a reduction in temperature of at least 20° C. in the range of temperatures 90-125° C. The black liquor is subsequently led along a line 32 to the first heat exchanger 11.

The temperature of the black liquor has been reduced by at least 20° C. in the range of temperatures 90-125° C. after its passage through the expansion vessel. The black liquor is subsequently led along a line 32 to the first heat exchanger 11.

An indirect exchange of heat is enabled in the first heat exchanger 11 between the black liquor and the bleaching filtrate that has been obtained from the bleaching plant. The bleaching filtrate maintains a temperature in the interval 45-90° C. immediately before it is to undergo heat exchange with the black liquor. The indirect heat exchange results in the bleaching filtrate obtaining a raise in temperature of at least 5° C., after which the heated bleaching filtrate is used in the bleaching plant. The temperature of the black liquor before the heat exchange remains essentially at the withdrawal temperature, in the interval 90-180° C.

The bleaching filtrate that is heated is filtrate from a washing arrangement arranged after a pre-bleaching stage, preferably an oxygen delignification stage. The heated bleaching filtrate is used as dilution fluid before this oxygen delignification stage, whereby the cellulose pulp that is to be delignified in an oxygen stage is not only diluted to a suitable consistency but also experiences heating, and thus a reduction in the requirement of steam or other form of heating.

Figure 4:
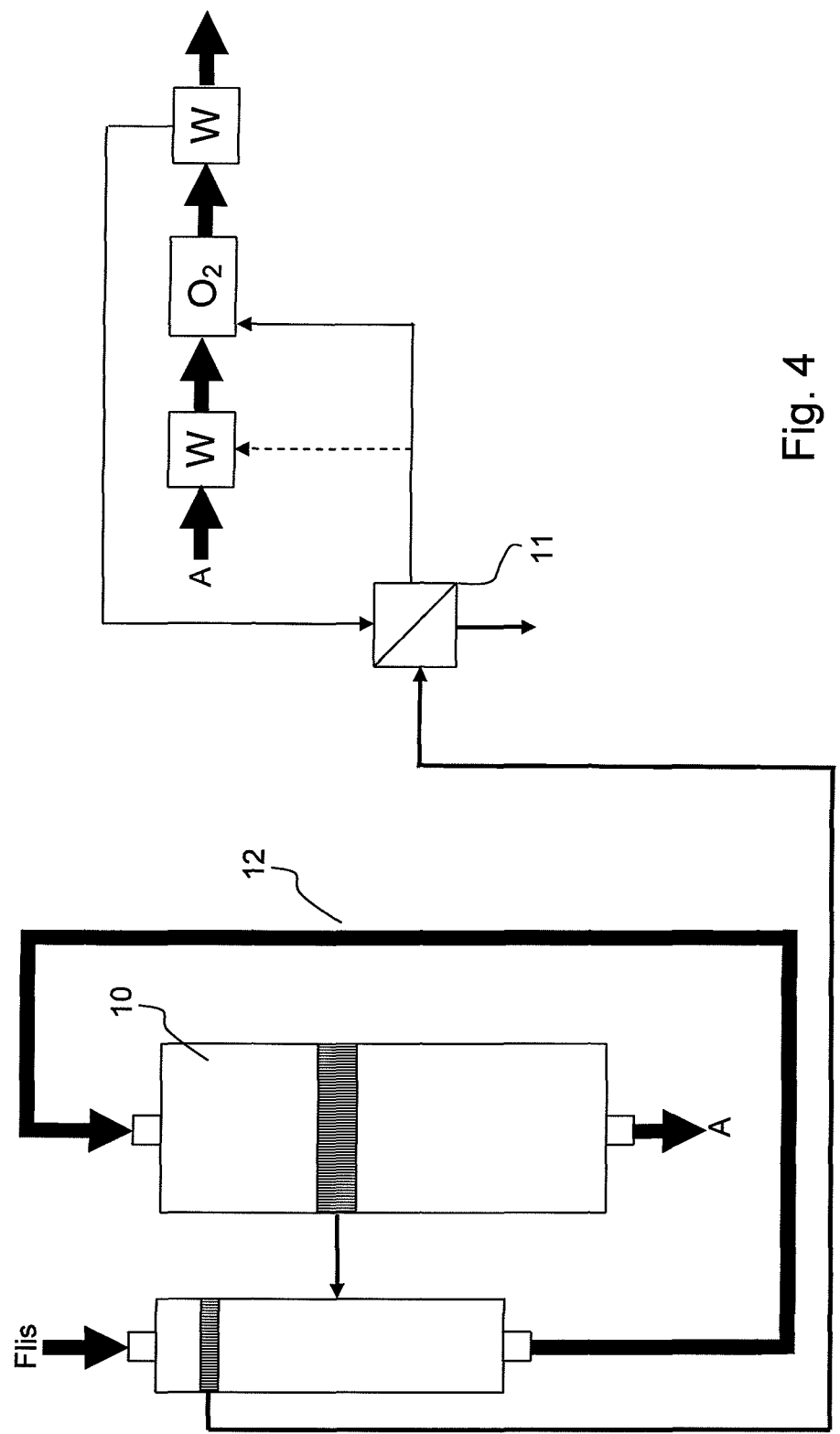
FIG. 4 shows a fourth preferred embodiment of the invention, in which the temperature of the black liquor is reduced by usage of the black liquor as impregnation fluid before the black liquor is led to indirect heat exchange with the bleaching filtrate.

FIG. 4 shows a fourth preferred embodiment of the method for which a patent is sought. Black liquor is withdrawn from the digester 10 at a temperature of 125-180° C., where the digester maintains a cooking temperature of 130-180° C.

At least a part of the withdrawn black liquor is led after the withdrawal of black liquor along a line 41 to an impregnation vessel 40. The black liquor functions in the impregnation vessel as an impregnation fluid in order to impregnate chips that are fed into the impregnation vessel. The black liquor after its function as impregnation fluid is fed out from the impregnation vessel, and it has experienced after this a reduction in temperature of at least 20° C. in the range of temperatures 90-125° C. The black liquor is subsequently led along a line 42 to the first heat exchanger 11.

The black liquor after its passage through the impregnation vessel 40 has experienced a reduction in temperature of at least 20° C. in the range of temperatures 90-125° C. It is subsequently led along a line to the first heat exchanger 11.

An indirect exchange of heat is enabled in the first heat exchanger 11 between the black liquor and the bleaching filtrate that has been obtained from the bleaching plant. The bleaching filtrate maintains a temperature in the interval 45-90° C. immediately before it is to undergo heat exchange with the black liquor. The indirect heat exchange results in the bleaching filtrate obtaining a raise in temperature of at least 5° C., after which the heated bleaching filtrate is used in the bleaching plant.

The bleaching filtrate that is heated is filtrate from a washing arrangement arranged after a pre-bleaching stage, preferably an oxygen delignification stage. The heated bleaching filtrate is used as dilution fluid before this oxygen delignification stage, whereby the cellulose pulp that is to be delignified in an oxygen stage is not only diluted to a suitable consistency but also experiences heating, and thus a reduction in the requirement of steam or other form of heating.

The following advantages are achieved by the invention:
Consumption of steam to heat the bleaching filtrate can be reduced or completely removed. This means that heating of the bleaching filtrate takes place in a manner that uses energy more efficiently.
Black liquor with a temperature in the range 90-125° C. can be used as heat-carrier in the bleaching plant. Black liquor at these low temperatures is normally cooled off, since it is not considered to have any value as a heat carried in the digestion process.

The invention is not limited to the embodiments revealed above: several variants are possible within the framework of the attached patent claims.

One such variant is that in which the first heat exchanger 11 is arranged in association with the digester 10, where the bleaching filtrate is led along lines from the bleaching plant to the first heat exchanger and returns to the bleaching plant.

The first heat exchanger 11 may also be arranged in association with the bleaching plant, where the black liquor is led along lines from the digester to the first heat exchanger, and subsequently to an evaporation process.

While the present invention has been described in accordance with preferred compositions and embodiments, it is to be understood that certain substitutions and alterations may be made thereto without departing from the spirit and scope of the following claims.

The invention claimed is:

1. A method to retrieve heat from black liquor, comprising:
withdrawing black liquor from a digester in association with a production of cellulose pulp,
the black liquor when withdrawn from the digester maintaining a first withdrawal temperature,
the digester maintaining a digestion temperature of 130-180° C., subsequent to withdrawal of the black liquor, reducing the first withdrawal temperature of the black liquor to a second temperature in a range of 90-125° C.,
leading at least a part of the black liquor at the second temperature to a primary heat exchanger,
exchanging heat in the primary heat exchanger between the black liquor and a bleaching filtrate that has been obtained from a bleaching plant and increasing a filtrate temperature of the bleaching filtrate to produce a heated bleaching filtrate, and
conveying the heated bleaching filtrate to the bleaching plant.

2. The method according to claim 1, wherein the exchange of heat results in the bleaching filtrate experiencing a rise in the filtrate temperature of at least 5° C.

3. The method according to claim 1 wherein the bleaching filtrate obtained from the bleaching plant has the filtrate temperature in a range of 45-90° C. before undergoing a heat exchange with the black liquor.

4. The method according to claim 3, wherein the withdrawn black liquor is used, before the withdrawn black liquor is led to the primary heat exchanger, in at least one stage of a digestion system, which results in the black liquor experiencing a fall in temperature of at least 20° C.

5. The method according to claim 3, wherein a withdrawal temperature of the black liquor is reduced to a reduced temperature through a preliminary heat exchange process in a preliminary heat exchanger with a process fluid in a digestion plant, the preliminary heat exchanger being prior to the primary heat exchanger.

6. The method according to claim 3, wherein the first withdrawal temperature of the black liquor is, prior to being led to the primary heat exchanger, reduced to a reduced temperature through at least one pressure reduction process in which steam is evaporated off from the black liquor.

7. The method according to claim 3, wherein the first withdrawal temperature of the black liquor is reduced to a reduced temperature by using the black liquor as impregnation fluid in an impregnation stage before digestion in the digester.

8. The method according to claim 1 wherein the heated bleaching filtrate is a filtrate from a washing arrangement arranged after a pre-bleaching stage wherein the heated bleaching filtrate is used as a dilution fluid before an oxygen gas stage.

9. The method according to claim 1 wherein the first heat exchanger is arranged in association with the digester wherein the bleaching filtrate is led along lines from the bleaching plant to the primary heat exchanger and returns to the bleaching plant.

10. The method according to claim 1 wherein the primary heat exchanger is arranged in association with the bleaching plant, wherein black liquor that maintains the second temperature is led along lines from the digester to the primary heat exchanger and thereafter to an evaporation process.

* * * * *